United States Patent
Wuschek et al.

(10) Patent No.: US 9,602,287 B2
(45) Date of Patent: Mar. 21, 2017

(54) METHOD AND SYSTEM FOR SIGNED STATELESS DATA TRANSFER

(75) Inventors: Michael Wuschek, Rauenberg (DE); Berthold Wocher, Gaiberg (DE)

(73) Assignee: SAP SE, Walldorf (DE)

( * ) Notice: Subject to any disclaimer, the term of this patent is extended or adjusted under 35 U.S.C. 154(b) by 388 days.

(21) Appl. No.: 13/151,419

(22) Filed: Jun. 2, 2011

(65) Prior Publication Data

US 2012/0311337 A1    Dec. 6, 2012

(51) Int. Cl.
*H04L 9/32* (2006.01)
*G06Q 30/06* (2012.01)

(52) U.S. Cl.
CPC ....... *H04L 9/3247* (2013.01); *G06Q 30/0601* (2013.01)

(58) Field of Classification Search
CPC .. H04L 9/3247; H04L 63/126; H04N 21/6125
USPC ........ 713/150–194; 726/1–36; 380/277–286; 709/277
See application file for complete search history.

(56) References Cited

U.S. PATENT DOCUMENTS

| | | | |
|---|---|---|---|
| 6,336,135 B1 * | 1/2002 | Niblett | G06F 9/541 707/E17.001 |
| 7,369,540 B1 * | 5/2008 | Giroti | 370/352 |
| 8,209,540 B2 * | 6/2012 | Brouwer et al. | 713/180 |
| 8,341,413 B2 * | 12/2012 | Belmonte | H04L 63/123 705/67 |
| 2005/0175031 A1 * | 8/2005 | Harley, Jr. | 370/466 |
| 2006/0036683 A1 * | 2/2006 | Bracewell et al. | 709/203 |
| 2006/0248119 A1 * | 11/2006 | Stanev | G06F 9/461 |
| 2008/0040484 A1 * | 2/2008 | Yardley | H04L 67/02 709/227 |

OTHER PUBLICATIONS

Jaewong Chung etal., "Fast Memory Snapshot for Concurrent Programming without Synchronization", ICS'09, Jun. 8-12, 2009, AMC 978-1-60558-498-0/09/06, (pp. 117-125, 9 pages total).

Cyprien Noel, "Extensible Software Transactional Memory", C3S2E-10, May 19-20, 2010, Montreal [QC, Canada], AMC 978-1-60558-901-5/10/05, (pp. 23-34, 12 pages total).

Frederick E. Petry et al., "Reconstruction of Algorithms from Memory Snapshots of their Execution", National Science Foundation, Grants No. GJ-34739X and GN 534.1, The Ohio State University, (date unknown), (pp. 530-534, 5 pages total).

* cited by examiner

*Primary Examiner* — Tae Kim
*Assistant Examiner* — Shiuh-Huei Ku
(74) *Attorney, Agent, or Firm* — Buckley, Maschoff & Talwalkar LLC

(57) ABSTRACT

According to some embodiments, a method and system provides receiving a first request for service from a client during a communication session by a server, providing a response to the first request to the client, the response to the first request including state information specific to the first request and a memory of the server; clearing the server memory of the state information specific to the first request; receiving, by the server, a second request for service from the client during the communication session, the second request including the state information specific to the first request; and restoring a state of the server memory based on the state information specific to the first request received in the second request.

20 Claims, 7 Drawing Sheets

METHOD AND SYSTEM FOR SIGNED STATELESS DATA TRANSFER

FIELD

Some embodiments generally relate to data transfers between device and systems. More specifically, some embodiments provide a method and system for providing data transfers between systems and devices where state information between data transfers is maintained and the resources of the devices and systems are used efficiently.

BACKGROUND

Systems and methods for processing requests between two or more systems and devices may be facilitated by, for example, a server-client architecture wherein requests for a service may be provided by an application server. In some use cases, a transaction between a client and a server may include a number of interactions between a client and a server, with the interactions of the transaction spanning a number of requests and responses during a communication session. In the course of providing responses to the client in a transaction, it may be beneficial for the server to retain some information used in processing a response for a request for proceeding a subsequent request. For example, a calculation made in providing a first response to a first request from a client may be useful in processing further requests from the client. However, retaining the data related to the first request from the client may require the server to commit resources (e.g., memory) to retaining data specific to the requests from the client for a duration of the transaction.

In some instances, committing resources to an on-going transaction between a client and server may present issues related to performance efficiency, load balancing, data integrity, data security, and other considerations.

DETAILED DESCRIPTION

As an introduction to embodiments of the present disclosure, a number of different types of application servers will first be discussed to highlight some of the problems and use cases providing motivation for the embodiments herein. Those skilled and knowledgeable in the arts related to application servers will understand the characteristics of stateful servers and stateless servers, as well as the differences therebetween.

Figure 1:
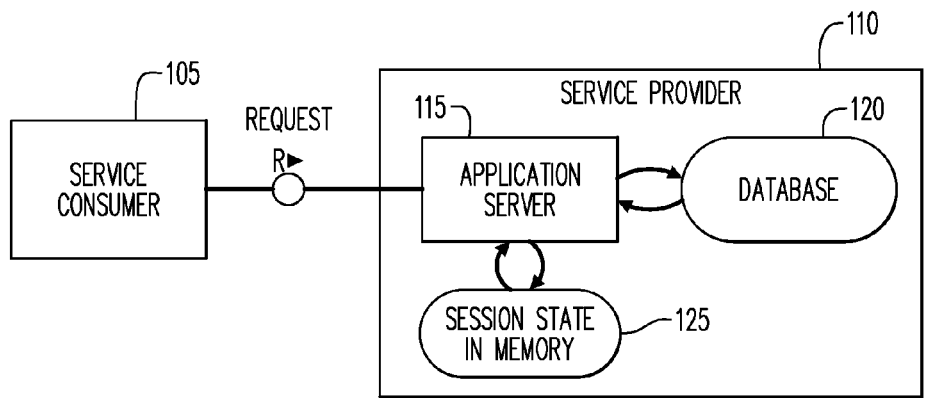
FIG. 1 is a block diagram of a system including a stateful server.

FIG. 1 is a block diagram of a system 100 including a service consumer 105 and a service provider 110. In the example of FIG. 1, service consumer functions as a client and service provider 110 includes an application server 115 having a database 120 and a memory 125. Although one service consumer 105 is shown in FIG. 1, more than one such service consumer may interact with service provider in a transaction with the service provider. In some instances, a transaction between the client and the application server may comprise a number of interactions over a period of time. For example, a service consumer 105 may interact with a service provider 110 in a shopping context wherein application server 115 performs a price determination based on a request from the client 105 including user input of products and quantities of the products. The price determination may be a complex and time consuming calculation, performed over multiple requests from the client. For example, a user may select and place product items in a shopping cart over a period of time, including a communication session that may be interrupted and then resumed at some later point in time. Upon resumption of the shopping session, the user may expect to see their shopping cart with the previously selected items at the previously calculated prices. It is not efficient for application server 115 to re-perform the price determination operations after each data exchange roundtrip between client 105 and application server 115. As a stateful server, the products and price determination results may be kept in memory 125 of application server 115. Thus, if the client sends a new request to application server 115, the application server is able to merge the new input of the new request against the existing memory state in the server's memory.

While any data calculated or determined by application server 115 stays under the control of the application throughout the transaction and does not necessarily have to be re-determined after each and every roundtrip, such state information does occupy the resources of the application server. Additionally, the application server 115 does not provide failover or load-balancing possibilities. For example, all requests of client 105 must be serviced by application server 115 since the state information is retained by application server 115. Scalability is also often limited with a stateful server since all requests from a client must be serviced by a same server.

If the example of FIG. 1 were to be implemented on a stateless server, where the state information (e.g., price determination information) is not retained by the server, application server 115 would need to re-perform the price determination operations after each data exchange roundtrip between client 105 and application server 115. A result of the price determination is transferred to the client with a response to the client and application memory 125 is cleared after each request. The client sends the price determination back to the application server in a second request, for use by the application server in processing the second request. In this scenario, the client gains control over data originated by the application server and might manipulate such data. The stateless application server would be faced with the problem of inconsistent data such that memory restored using the price determination data from the client (e.g., product, quantity and pricing results) may not match. Accordingly, the application server must re-perform and validate all data send by the client in the new request. Such repeated determinations are inefficient from a performance perspective.

Figure 2:
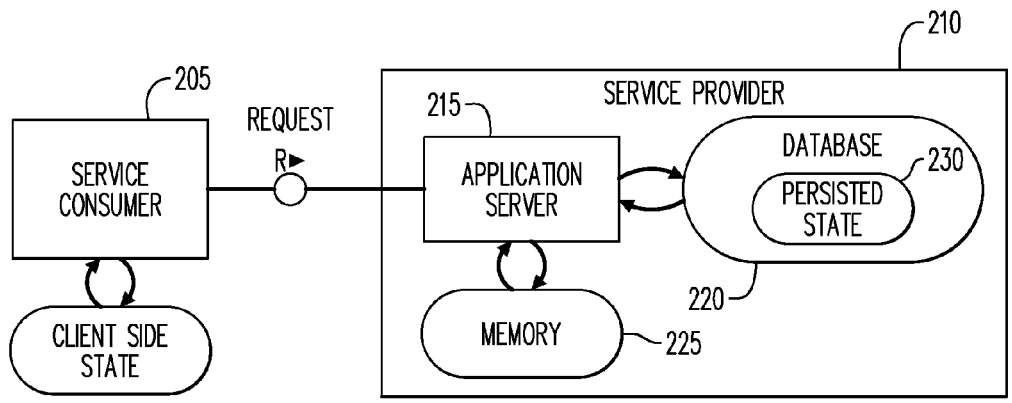
FIG. 2 is a block diagram of a system including a "technically stateless" server.

FIG. 2 provides an alternative to a conventional stateless server. FIG. 2 depicts a system 200 including a client 205 and a service provider 210 having a "technically stateless" application server 215, a database 220 and a memory 225 associated with the application server. Continuing the shopping cart example introduced above now in FIG. 2, a price request is received from client 205 and application server 215 determines the price. The price determination is provided to client 205 in a response to the client's request. In between requests from client 205, server memory 225 does not retain any state information related to the request(s) from the client, such state information is persisted in database 120. However, persisting the state information on database 120 requires making repeated calls to the database which may be inefficient from a performance perspective.

Figure 3:
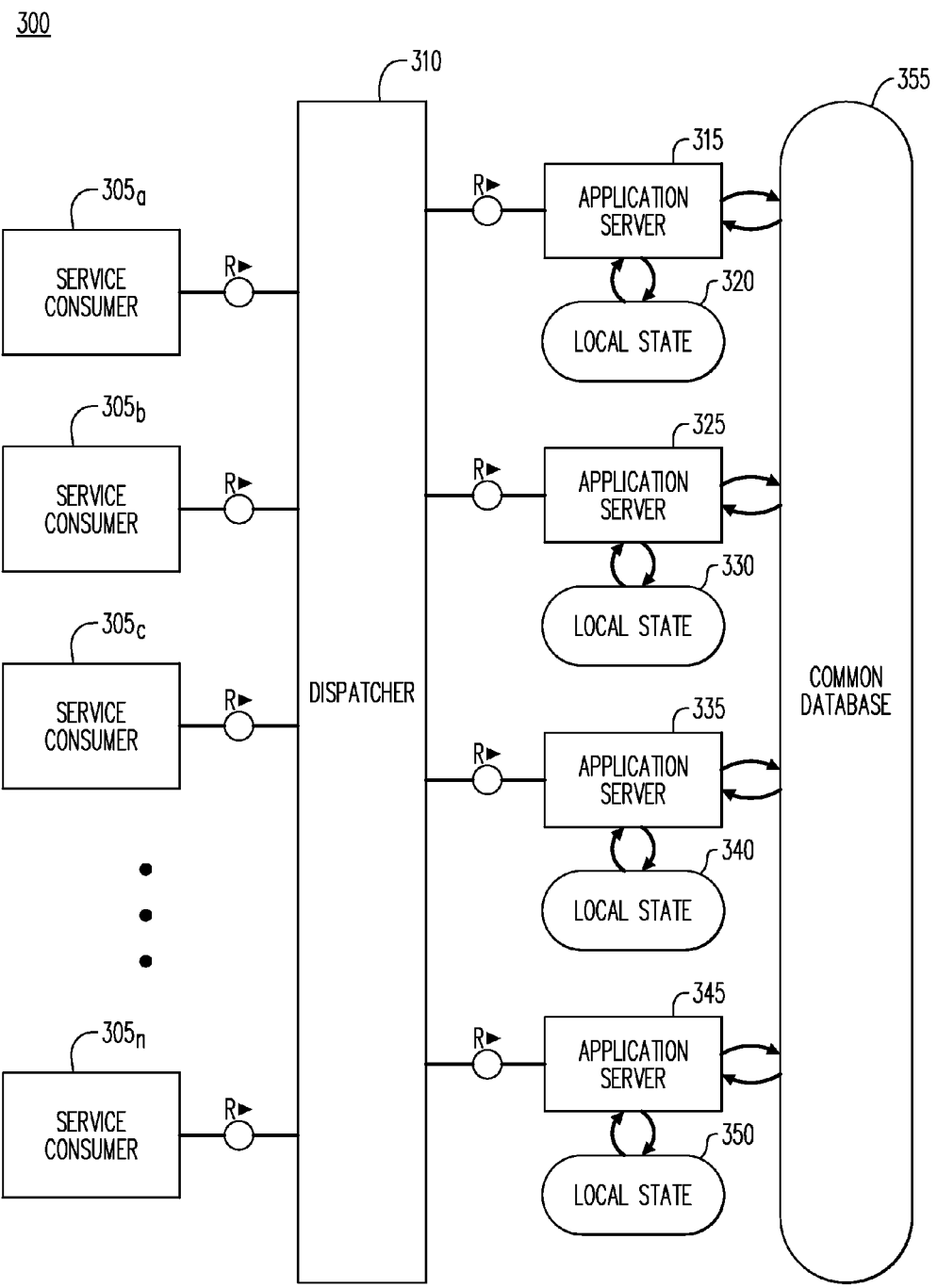
FIG. 3 is a block diagram of a system according to some embodiments.

FIG. 3 is a block diagram of a system 300 according to some embodiments. System 300 illustrates a client-server architecture including a plurality of client devices, service consumer systems or devices 305a, 305b, 305c, . . . 305n (generally referred to herein as client(s) 305), and a plurality of application servers 315, 325, 335, and 345. In some embodiments, the functionality and services provided by application servers 315, 325, 335, and 345 may be implemented in one or more configurations of hardware, software, and firmware. The application servers each have a local memory for storing state information of its associated application server. For example, application server 315 includes local memory 320, application server 325 includes local memory 330, application server 335 includes local memory 340, and application server 345 includes local memory 350. Each of the application servers includes one or more processors, co-processors, or processing units (not shown) for processing requests from clients 305 by executing program code to provide responses to the requests. Application servers 315, 325, 335, and 345 are further shown coupled to a common database 355. The application servers may access database 355 to write/read data to/from the database as needed to, for example, process the requests from clients 305.

While application servers 315, 325, 335, and 345 are shown in the example of FIG. 3 as separate devices, one or more of the depicted application servers may be provided by one server configured to deliver the services of the one or more separate servers 315, 325, 335, and 345. In some aspects, one or more of the application servers of system 300 may be authorized to access certain portions and/or services of common database 355 based on a security scheme or other considerations. In some embodiments, common database 355 may include one or more local, remote, or distributed database system configurations.

System 300 may also include a dispatcher 310 that provides an interface to couple the clients and the servers to each other. In some instances, dispatcher 310 operates to distribute requests from clients 305 to the applications servers that will execute requests. In some embodiments, dispatcher 310 may distribute the work load for processing requests from clients 305 amongst the plurality of application servers 315, 325, 335, and 345 according to a load balancing scheme, a redundancy protocol, and other performance considerations.

Those skilled in the relevant arts pertinent to the present disclosure will appreciate that the routing of requests from clients 305 to the application servers may be provided over a network (not shown). In some embodiments, the network may include the internet and support an exchange of data using the Standard Internet Protocol Suite, TCP/IP, although the methods and systems herein may utilize networks having different types of communication connection modes, protocols, topologies, etc. without limit.

FIGS. 4A-4E are block diagrams of a system 400, each illustrating aspects of a signed stateless data transfer process according to some embodiments herein. In some embodiments, some of the processes disclosed herein may be implemented by a system including aspects of systems 300 and 400. It will be appreciated by those skilled in the arts relevant to the present disclosure that systems other than those explicitly disclosed in FIGS. 3 and 4A-4E may be used to implement the processes herein. Similar components in FIGS. 4A-4E have similar reference numbers.

Figure 4A:
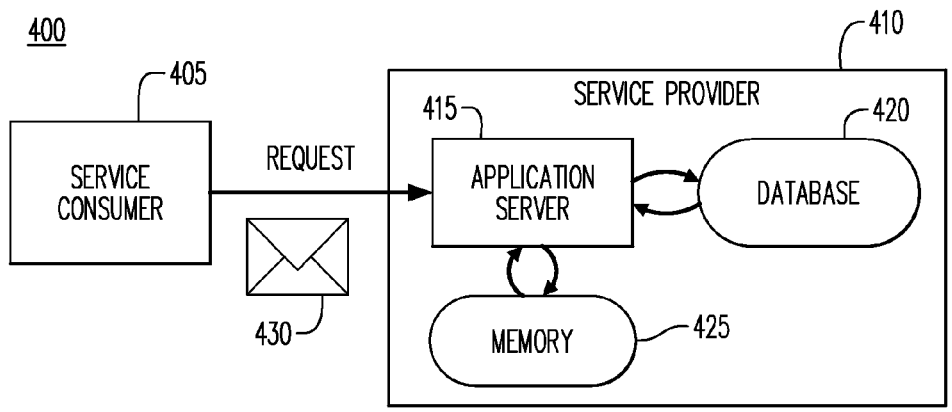
FIGS. 4A-4E are block diagrams of a system, each illustrating aspects of a signed stateless data transfer process according to some embodiments.

FIG. 4A depicts some aspects of a signed stateless process data transfer process according to some embodiments herein. In particular, FIG. 4A discloses a system 400 including a service consumer, client 405, and a service provider 410. As shown, service provider 410 includes an application server 415, and a database 420 and a memory 410 associated with the application server. Further illustrated in FIG. 4A is a request 430 from client 405 being received by application server 415. In accordance with some embodiments, a communication session is opened (e.g., initiated or resumed) to facilitate communication between client 405 and application server 415. In response to the request for service during the communication session from the client, application server 415 processes the request, including accessing database 420 as needed to fulfill the request. Additionally, state information associated with request 430 from the client is stored in server memory 425 associated with application server 415. In some embodiments, the state information associated with request 430 from the client may include data calculated or determined by application server 415 in processing the request. In some aspects, the state information associated with request 430 from the client and stored in server memory 425 may include program code and other data associated with application server 415 and used for processing request 430.

Figure 4B:
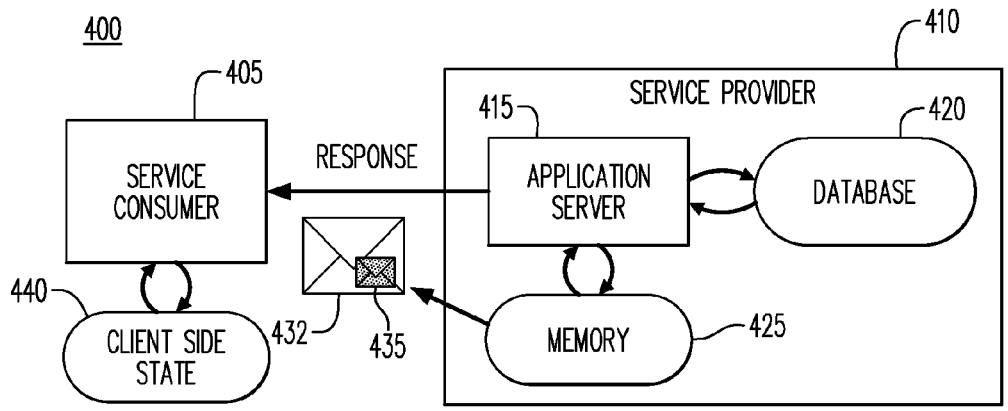

In FIG. 4B application server 415 provides a response 432 in reply to request 430 from the client. In some embodiments, response 432 includes the state information associated with request 430 and server memory 425. As illustrated in FIG. 4B, server memory content 435 may be provided with response 432, where memory content 435 includes the state information associated with request 430 from the client. In some aspects, memory content 435 includes a "snapshot" of that portion of the server's memory used to fulfill the client's request (i.e., the state information associated with the request from the client and stored in server's memory). As used herein, the "snapshot" is of the server memory storing data related to the fulfillment of the request (e.g., 430) from the client. In some embodiments, memory content 435 associated with the client's request 430 is attached to or included with response 432 provided to client 405. In some embodiments, memory content 435 may be transferred to client 405 in a data transfer (e.g., message) separate from response 432.

Figure 4C:
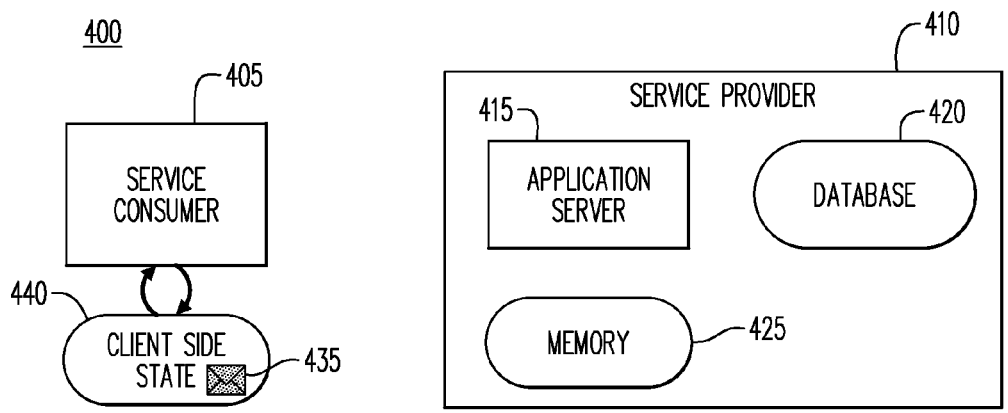

In FIG. 4C, subsequent to providing response 432 and memory content 435 to client 405, server memory 425 is cleared of the state information associated with request 430 from the client. That is, application server 415 does not retain or hold any state information related to request 430 from the client. Furthermore, response 432 and memory content 435 has been received by client 405 in FIG. 4C. As shown, memory content 435 is stored by the client. In some embodiments such as the example of FIG. 4C, memory content 435 is stored in client memory 440. In some instances, the communication session established (e.g., initiated or continued) in FIG. 4A may be interrupted for at least a period of time during the phase of the stateless data transfer process depicted in FIG. 4C.

Figure 4D:
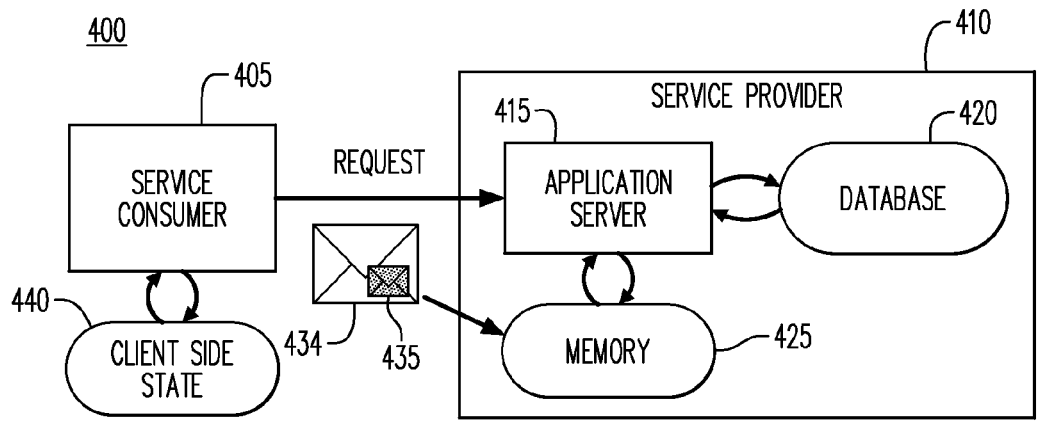

FIG. 4D illustrates a subsequent request 434 for service being sent from client 405. In some instances, the communication session established (e.g., initiated or continued) in FIG. 4A may be resumed or continued in FIG. 4D. In some embodiments, request 434 from client 405 includes memory content 435, including the state information associated with the previous request 430 from the client. From another perspective, memory content 435 including the state information associated with the previous request 430 from client 405 is received from the client and used to restore server memory 425 with the state information associated with client 405 and the previous request 430. With its memory 425 restored with the state information associated with client 405 and the previous request 430, application server 415 may process request 434 with the benefit and use of the state information associated with the previous request 430. In this manner, application server 415 may process subsequent request 434 using the state information associated with the previous request 430, continuing the transaction of the previous request 430 without a need to recalculate or repeat determinations performed with the processing of the previous request 430.

Figure 4E:
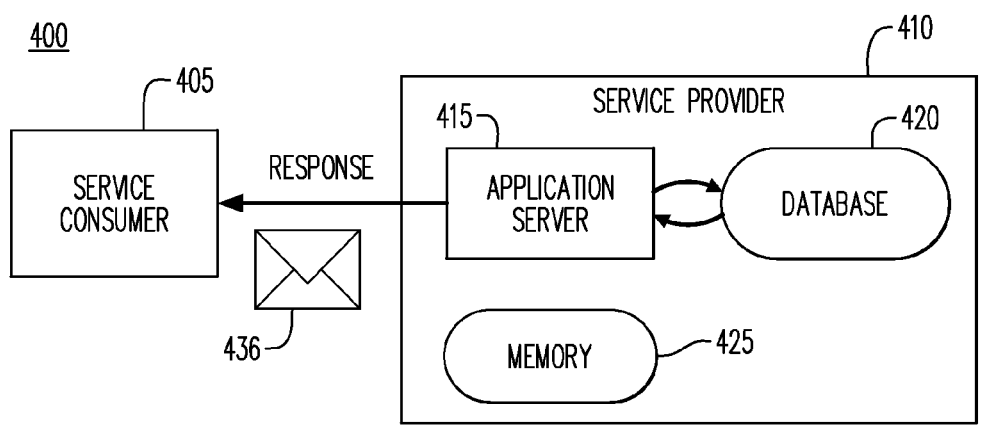

In FIG. 4E server application 415 provides a response 436 in reply to request 434. In the example of FIG. 4E, the processing of request 434 and the providing of response 436 in reply thereto completes the transaction between client 405 and application server 415. Since response 436 completes the transaction between client 405 and application server 415, state information regarding request 434 may not be needed for future reference or use. Accordingly, response 436 does not include a "snapshot" or other memory content associated with request 434 from the client. Furthermore, data associated with the processing of the requests from client 405 may be persisted in database 420, thereby freeing resources of server memory 425.

In some instances, request 434 and/or further requests (not shown) from client 405 may not conclude a transaction between client 405 and service provider 410, as shown in FIG. 4E. Accordingly, state information related to request 434 and/or the further requests may be used by server 425 in processing additional client requests subsequent to the request 434 and/or further requests during the communication session between client 405 and the application server 415. In some embodiments of these instances, a response to request 434 and/or the further requests provided to client 405 may include memory content from server memory 425, including a "snapshot" of the server's memory used to store state information associated with the request 434 and/or the further requests from the client and used to fulfill those requests. In the instances including additional requests that may not conclude a transaction between client 405 and service provider 410, further request-response sequences similar to those depicted in FIGS. 4A-4D may be invoked until a final request of the transaction concludes with a response being provided to client 405 that does not include any server memory state information associated with request(s) from the client, as shown in FIG. 4E.

In accordance with aspects herein, the stateless data transfer illustrated in FIGS. 4A-4E provides a mechanism wherein the application server may efficiently process and respond to multiple requests from the client during a communication session without a need to commit server resources (e.g., server memory 425) to maintaining state information related to the requests from the client over the multiple requests.

In some aspects, requests from a client herein may be processed and responded to by a plurality of different servers since state information relating to requests from the client and used in processing subsequent requests from the client is provided to the server that will fulfill the subsequent requests by the service requesting client. Thus, embodiments herein offer scalability since a specific server need not be used for an entire transaction including the multiple requests and additional servers may be introduced without impacting the request-response sequence. For example, in some embodiments any one of the application servers in system 300 depicted in FIG. 3 may be used to respond to requests from one of the clients 305. In some aspects, dispatcher 310 may be involved in determining which of the application servers 315, 325, 335, and 345 the request from the client is routed to for responding to the client's request. Such routing determinations may be based on one or more considerations of scalability, load balancing, power consumption, and other performance factors.

Figure 5:
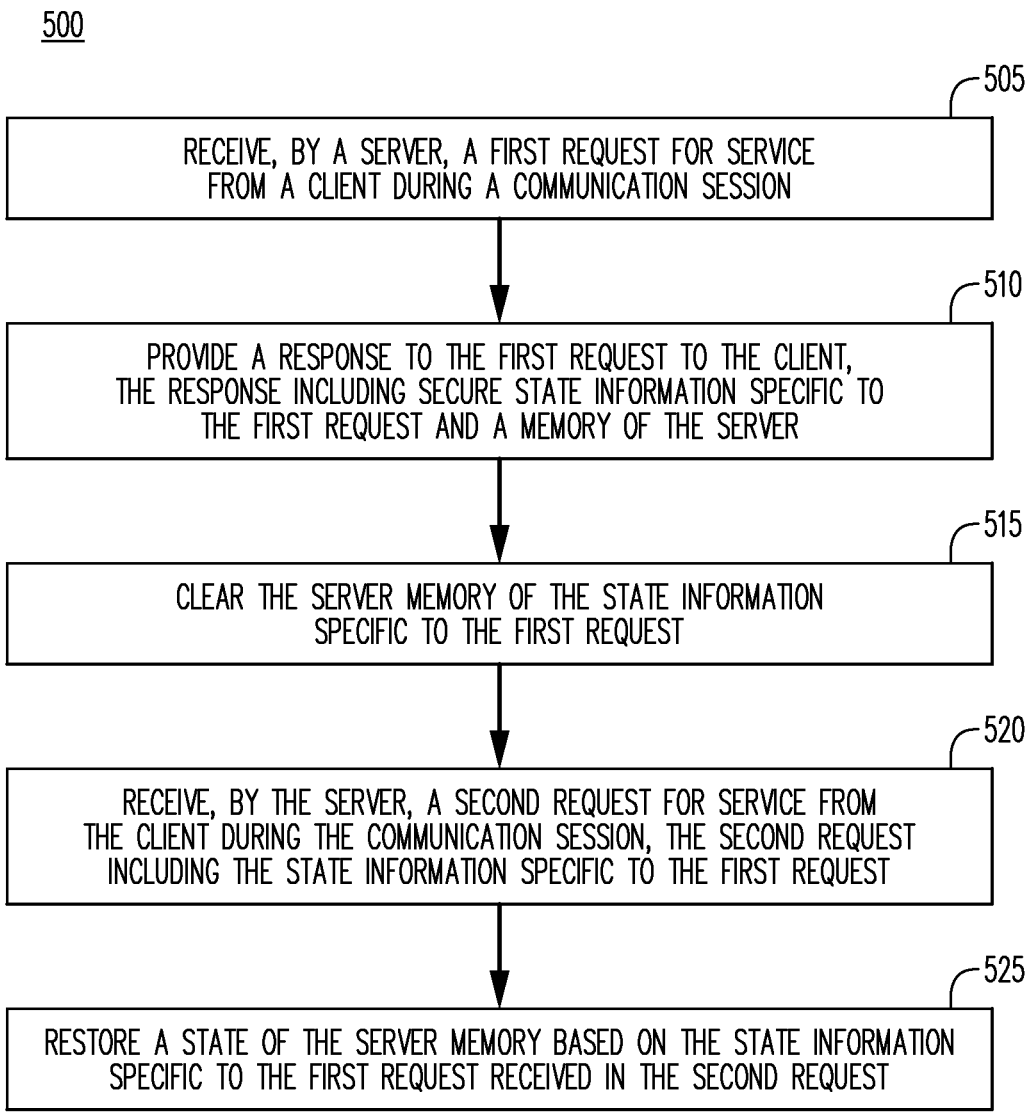
FIG. 5 is a flow diagram of a process for stateless data transfer according to some embodiments.

FIG. 5 is a flow diagram of a process 500 for a stateless data transfer between devices and systems, according to some embodiments herein. Some aspects of process 500 may be implemented by the systems 300 and 400 disclosed herein, but are not limited thereto. At operation 505, a server receives a first request for service from a client device or system. This first request may initiate, open, commence, or resume a communication session between the client and the server. In some aspects, the communication session may be facilitated by a combination of wired and wireless communication links, using one or more different communication protocols without limit to any specific protocol. Upon receipt of the request, the server may proceed to fulfill the request. The server may access and use its associated resources, including but not limited to a processor, a local memory, and a data storage system (e.g., a database), to fulfill the request from the client.

The request from the client may be part of an on-going transaction spanning multiple interactions between the client and the server. Based on the nature of the transaction, the server may retain state information regarding the request from the client so that, for example, a subsequent request from the client and related to the first request may be processed without a need for the server to re-determine, recalculate, or reprocess calculations or determinations made in processing the first (or a previous) request from the client that may be used in or for processing the subsequent request(s) from the client. The server may store the state information specific to the first request in a local memory or other storage resource associated with the server.

Having processed the request from the client at operation 505, the server provides a response to the first request to the client at operation 510. In accordance with embodiments herein, the server provides the state information specific to the first request and to the memory of the server to the client with the response. In some embodiments, a copy, a persistence, or a "snapshot" of the information specific to the first request of the client is provided from the server's memory to the client in responding to the request from the client. In some aspects, the memory content including the information specific to the first request of the client may be attached to or included with the response sent to the client by the server in a common message or data package exchange. In some aspects, the memory content including the state information specific to the first request may be associated with the response sent to the client in reply to the first request of the client but may be sent in a separate or different message or data package exchange than a message or data exchange that satisfies client's first request.

At operation 515, a copy or persistence of the state information specific to the first request may be cleared or otherwise no longer committed to the memory of the server.

In some embodiments, the server memory used by the state information specific to the first request may be overwritten or used by the server for the purpose of storing data other than the state information specific to the first request.

At operation 520, the server receives a second request for service from the client during the communication session related to the first request from the client. The second request may include the state information specific to the first request as forwarded to the client with the first response from the server.

It is noted that the second request need not be a sequentially next request from the client to the server. Also, the communication session does not need to maintain a continuous communication link between the client and server an entire time between the first request and the second request.

Based on the state information specific to the first request of the client received by the server in connection with the second request from the server, the server may proceed to process the second request in the on-going transaction between the client and the server. The state information specific to the first request and included in the second request may allow the server to resume the transaction with the client without a need to recalculate or to re-determine values, calculations, and determinations previously calculated and determined in processing the first request from the client and helpful in processing the second request from the client. The inclusion of the state information specific to the first request with the second request from the client may alleviate a need for the server to maintain or commit server memory resources to storing the state information specific to the client over multiple requests.

As shown in process 500, the application server restores its memory concerning the second request from the client based on the state information specific to the first request of the client received by the server with the second request. Since the server relies on the state information sent to the server from the client, some embodiments herein provide a mechanism to ensure the state information specific to the first request is the same state information sent to the client by the server. A procedure to assure that the state information specific to the first request of the client and included with the second request is the same as the state information sent to the client by the server with the first response may provide a level of data integrity that the server may confidently rely on for restoring its memory.

Figure 6:
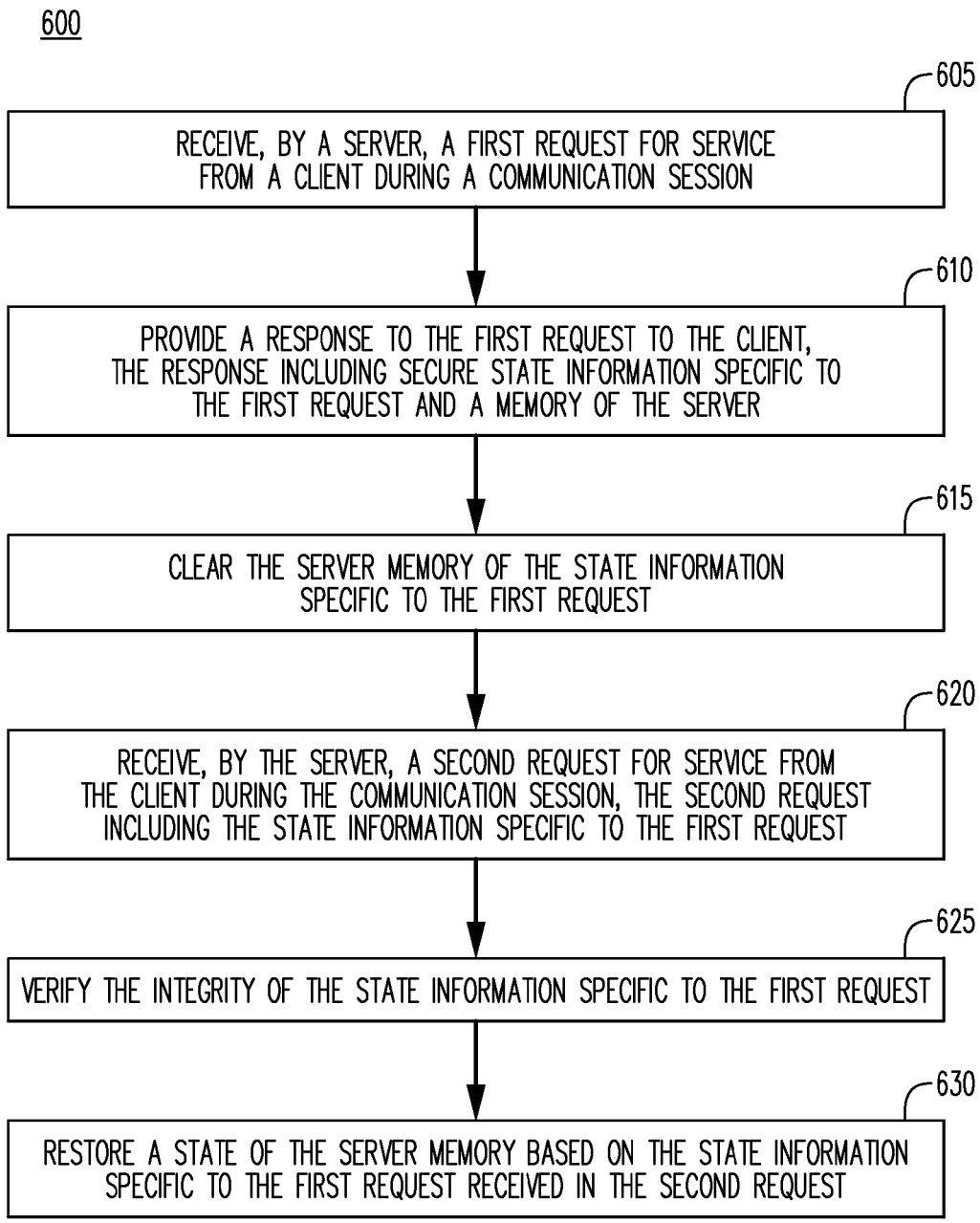
FIG. 6 is a flow diagram of a signed stateless data transfer process according to some embodiments.

FIG. 6 is a flow diagram of a process 600 for a signed stateless data transfer between devices and systems, according to some embodiments herein. Some aspects of process 600 may be implemented by the systems 300 and 400 disclosed herein, but are not limited thereto. A number of the operations of process 600 are similar to the operations of process 500 shown in FIG. 5. As such, an understanding of operations 605, 615, 620, and 630 may be had based on the detailed discussion above regarding operations 505, 515, 520, and 525, respectively.

At operation 605, a server receives a first request for service from a client device or system. The server processes the request at 605, using its available resources such as its processor, local memory, and an accessible database. In the instance the first request from the client is part of an on-going transaction spanning multiple interactions between the client and the server, the server may retain state information regarding the first request from the client for some of the reasons discussed hereinabove. The server may store the state information specific to the first request in a local memory or other storage resource associated with the server.

At operation 610, the server provides a response to the first request to the client. In accordance with embodiments herein, the server provides the state information specific to the first request and the memory of the server to the client with the response. In some embodiments, a copy, a persistence, or a "snapshot" of the information specific to the first request from the server's memory is provided to the client in responding to the request from the client. The memory content including the state information specific to the first request may be attached to or included with the response sent to the client by the server.

In accordance with some embodiments herein, the state information specific to the first request of the client is "signed". That is, a digital signature (or other data security) scheme is used to bind the sending server's identity to the state information being sent to the client to indicate the origin (and possibly other aspects) of the state information. The server's identity may be indicated by an identifier, a certificate, etc. In some embodiments, the signature and/or aspects of the signature may be associated with meta data that describes aspects of the signature such as, for example, the server identifier included in the signature. In some aspects herein, the signature may encapsulate/envelope the portion of the server's memory used to create the snapshot.

One purpose of the signature may be to indicate whether the state information having the signature has been changed. In accordance herewith, any change of the state information having a signature will automatically render the signature invalid. In some aspects, a client may use a signed snapshot of state information but the client may not change the content thereof without invalidating the signature. Furthermore, in some embodiments the server(s) will only restore their memory or otherwise use state information if they state information has a valid signature.

The digital signature may be bundled with the state information specific to the first request of the client, notwithstanding the particular format or data structure of the response and the state information included with the response to the client's request(s). In some embodiments, the digital signature may be used with a public key environment, as will be understood by those skilled in the related arts. It is noted however that embodiments herein are not limited to any particular data authentication and integrity scheme or services.

Returning to FIG. 6, process 600 proceeds to operation 615 where a copy or persistence of the state information specific to the first request of the client may be cleared or otherwise no longer committed to the server's memory. From operation 615, process 600 continues to operation 620 where the server receives a second request for service from the client during the communication session related to the first request from the client. In this example, the second request includes the signed state information specific to the first request as forwarded to the client with the first response from the server. In some aspects, the second request need not be a sequentially next request from the client to the server and the communication session does not need to maintain a continuous communication link between the client and server an entire time between the first request and the second request.

Before proceeding to process the second request from the client based on or with the use of the state information specific to the first request, the server may verify the integrity of the state information received from the client with the second request at operation 625. As mentioned above, the signature of the state information will automatically be rendered invalid if the signed state information is manipulated, changed, or altered in any way by any entity other than the server, in accordance with aspects herein. Only in the instance the signature is verified to be valid at operation 625, will the server restore its memory based on the signed state information and proceed to process the second request of the client at operation 630. If the validity of the signature cannot be verified, the server may not process the request from the client based on or using the invalidated state information associated with the signature.

In the instance the signature is verified to be valid at operation 625, process 600 continues to operation 630 where the server restores its memory based on the signed state information and proceeds to process second request of the client.

Accordingly, it is seen that some embodiments herein provide a mechanism for a signed stateless data transfer between devices and systems that efficiently uses server resources, as well as providing data integrity.

In some embodiments, a response provided in reply to a request for service herein (e.g., response 432 in FIG. 4B) may be compressed to reduce a bandwidth needed to transport the response and/or the storage space needed to store the response. In some embodiments, the response may be encrypted according to an encrypting technique or scheme, without limits herein. In some aspects, the snapshot of the server memory associated with the request from the client and provided to the client with the response (e.g., snapshot 435 in FIG. 4B) may be compressed and/or encrypted, whether signed or not. In some embodiments, the compression, encryption, and signing of the server memory snapshot may be performed (if at all) independently of a compression and/or encryption of other aspects of the response provided to the client. Furthermore, the various aspects of compressing, encrypting, and signing of the server memory snapshot may each be provided by the server (if at all) independently of each other.

In some embodiments, a snapshot of a server memory as disclosed herein may be signed and included in every roundtrip data exchange (e.g., request—response) between and client and a server. In some aspects, the signature indicates the origin of the signed snapshot. In accordance with some embodiments, an application server herein will not restore its memory based on a snapshot or other state information having an invalid signature. In some embodiments of a server receiving a valid signature, the server may restore its memory without processing any input checks or application logic. As such, there may be a minimal additional load for the application to restore its memory using a snapshot or state information having a signature verified as being valid.

In some aspects herein, a signature used to authenticate a snapshot or state information of a server memory may be used, if at all, independently of an authentication procedure (if any at all) that may be used to provide, grant, or permit communication between a client and a server.

In some aspects, the snapshot or other data structure including state information of the server relating to the request(s) of the client herein may be formatted in a variety of manners. In some aspects, the snapshot including state information may be provided in a memory dump. In this option, all of the data in the content blocks of a server memory storing or reserved for storing the subject state information is transferred to the client in the, for example, snapshot. The data transferred may include application data and at least some of the program code used to or associated with processing of the application data.

In another option for formatting the snapshot or other configuration of the state information, the state information may be serialized for data exchanges between the client and the server. In this option, application data of the server's memory is separated from the program code related to the subject sate information such that the original data objects may be reconstructed within application server. In aspects herein, only the serialized application data is transferred to the client. Upon receipt of the serialized data, the application server is able to rebuild the original data objects of the state information therefrom.

In some embodiments, a snapshot of the server memory may be both serialized and compressed. In some such embodiments including character-like fields, the data volume of the memory snapshot may be reduced by about a factor of 10 as compared to a memory snapshot that is not serialized and compressed. In some embodiments using a serialized and compressed signed snapshot, methods and systems herein may include a server receiving the serialized snapshot in a request from a client, determining a validity of the signature, and decompressing and de-serializing the snapshot into the server's memory.

In accordance with various aspects herein, methods and systems herein may provide a number of advantages and benefits. In some aspects, a system herein may react like a stateless server with the advantages thereof from a client's perspective, whereas from a server's perspective the system may behave in a stateful manner once a request is processed. Accordingly, load balancing may be provided in some embodiments, in a manner similar to a stateless application. In some embodiments, implementing aspects herein may not require a modification or alteration of an application or service. For example, existing business logic on an application server may not require an upgrade or other modification to provide the serializing and de-serializing of a memory snapshot (and other aspects) herein since a central function may be sufficient to provide such a feature(s).

Some embodiments herein have been described in the context of a variety of client server applications. In some further embodiments, aspects of the stateless data transfer systems and methods herein may be implemented in combination with other existing technologies including, for example, a stateless server and a stateful server. In effect, methods and systems disclosed herein may be combined with other existing or future developed systems, methods, and devices in a "hybrid" mode. In hybrid mode, an application server may operate according to multiple system configurations including stateful, stateless, and signed stateless data transfer methods disclosed herein. A hybrid mode of operation may be beneficial in many contexts. For example, an application server providing a social networking service may operate in a stateful manner when demand/loads are low (e.g., relatively few users logged into service) and the application server may transition to operate according to the signed stateless data transfer methods disclosed herein as demand loads increase (e.g., busy time for the social networking service when many users are logged into the service). Another example may include a situation where an application may operate in a stateful configuration provided sufficient resources (e.g., memory) are available to support such. However, in the instance the application experiences insufficient resources (e.g., high loads, a high number of client sessions, etc.) the application may make a switch to operate in accordance with the stateless data transfer methods and systems herein, including the signed stateless transfer methods and systems, until the load returns to a lower level that may be sufficiently supported by a stateful operation. In some aspects, the decision of when and which protocol to use (i.e., stateless data transfer or stateful) may be based on other factors such as, for example, required bandwidth, client capabilities, etc.

In another example of a "hybrid" mode of operation including both a stateful operation and a stateless data transfer operation as disclosed herein, the hybrid mode of operation may be used so that an application may store some of its data in a stateful manner and yet transfer other parts to the client using a signed stateless data transfer mode of operation.

Figure 7:
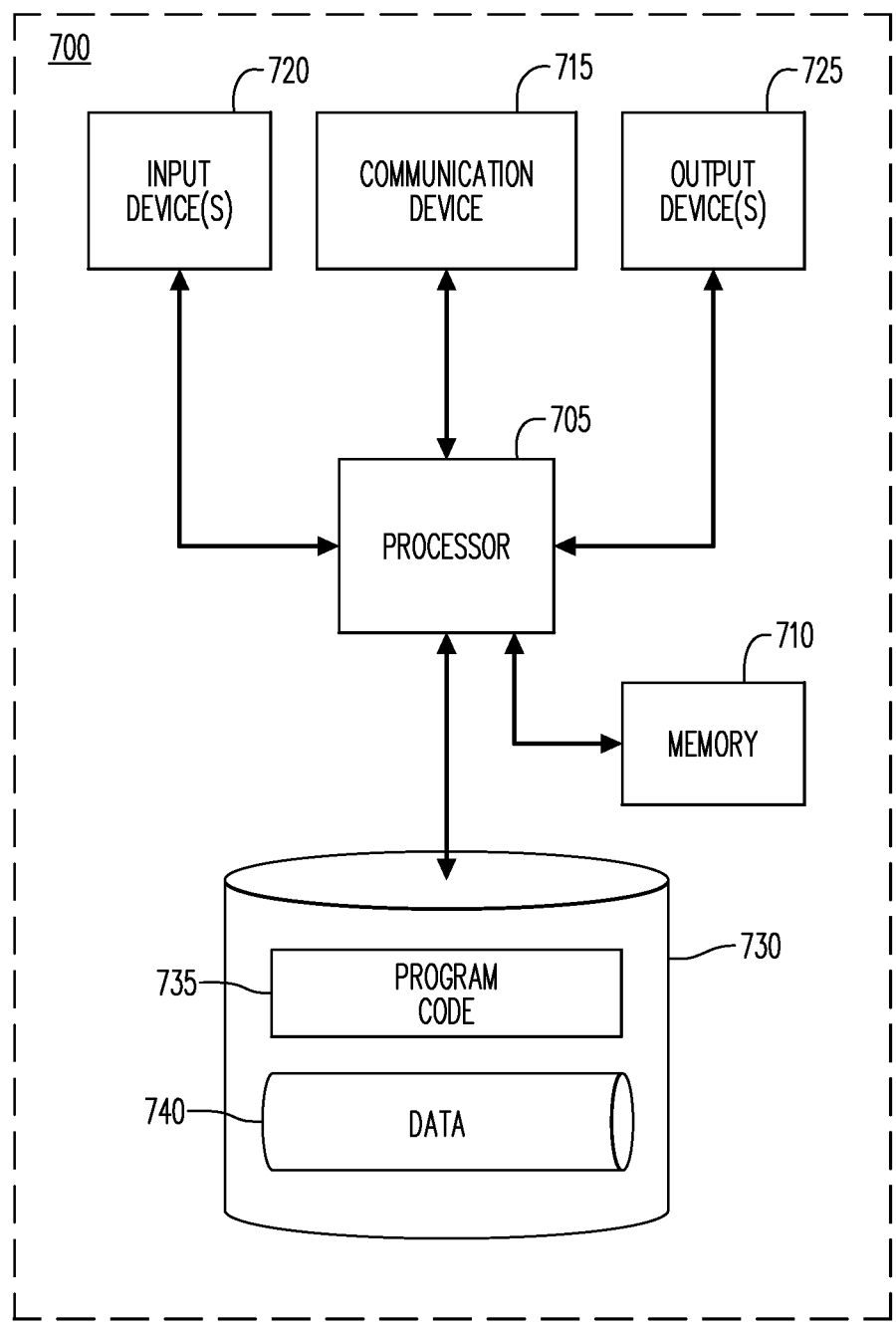
FIG. 7 is a block diagram of a system according to some embodiments.

FIG. 7 is a block diagram overview of a system or apparatus 700 according to some embodiments. The system 700 may be, for example, associated with any of the devices described herein, including for example service consumer devices 305 and 405 (i.e., clients) and application servers 315 and 415. The system 700 comprises a processor 705, such as one or more commercially available Central Processing Units (CPUs) in form of one-chip microprocessors or a multi-core processor, coupled to a communication device 715 configured to communicate via a communication network (not shown in FIG. 7) to another device or system. In the instance system 700 comprises an application server (e.g., server 315 or 415), communication device 715 may provide a means for system 700 to interface with a client device (e.g., client 305 or 405). Device 700 may also include a local memory 710, such as RAM memory modules. The system 700 further includes an input device 720 (e.g., a touchscreen, mouse and/or keyboard to enter content) and an output device 725 (e.g., a computer monitor to display a user interface element).

Processor 705 communicates with a storage device 730. Storage device 730 may comprise any appropriate information storage device, including combinations of magnetic storage devices (e.g., a hard disk drive), optical storage devices, and/or semiconductor memory devices. In some embodiments, storage device may comprise a database system.

Storage device 730 stores a program code 735 that may provide computer executable instructions for processing requests from, for example, client devices in accordance with processes herein. Processor 705 may perform the instructions of the program 735 to thereby operate in accordance with any of the embodiments described herein. Program code 735 may be stored in a compressed, uncompiled and/or encrypted format. Program code 735 may furthermore include other program elements, such as an operating system, a database management system, and/or device drivers used by the processor 705 to interface with, for example, peripheral devices. Storage device 730 may also include data 740. Data 740 may be used by system 700, in some aspects, in performing the processes herein.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, the method comprising:
implementing, by the computer, operations of the method in the following order:
receiving, by a server, a first request for service from a client during a communication session;
processing, by the server, the first request from the client;
storing state information specific to the first request in a memory of the server, the state information specific to the first request comprising one of: a data structure including application data and at least some program code for executing the application data and a data structure including application data;
providing, by the sever, a response to the first request to the client, the response to the first request including state information specific to the first request and to the memory of the server, the state information including data determined in the processing of the first request from the client;
clearing the server memory of the state information specific to the first request;
receiving, by the server, a second request for service from the client during the communication session, the second request including the state information specific to the first request and the data determined in the processing of the first request from the client that was previously stored in the memory of the server; and
restoring a state of the server memory based on the state information specific to the first request received in the second request.

2. The method of claim 1, wherein the communication session between the server and the client is interrupted for at least one period of time between the first request and the second request.

3. The method of claim 2, wherein the communication session is resumed prior to the receiving of the second request.

4. The method of claim 1, further comprising:
associating, by the server, a digital signature with the state information specific to the first request, wherein the response to the first request provided to the client includes the signature associated with the state information specific to the first request.

5. The method of claim 4, further comprising:
verifying, by the server, the signature associated with the state information specific to the first request, wherein the second request received by the server from the client includes the signature associated with the state information specific to the first request.

6. The method of claim 5, wherein the verifying comprises determining whether the signature associated with the state information specific to the first request received by the server with the second request has been changed, and restoring the state of the server memory based on the state information specific to the first request only in an instance the signature has not been changed.

7. The method of claim 1, further comprising:
encrypting the state information specific to the first request included with the response to the first request provided to the client; and decrypting the state information specific to the first request included with the second request received by the server from the client.

8. The method of claim 1, further comprising processing the second request using the restored state of the server memory.

9. A service provider server system, comprising:
a memory having program instructions stored thereon; and
a processor in communication with the memory, the processor being operative to, in the following order:
receive a first request for service from a client during a communication session;
process the first request from the client;
store state information specific to the first request in a memory of the server, the state information specific to the first request comprising one of: a data structure including application data and at least some program code for executing the application data and a data structure including application data;
provide, by the server, a response to the first request to the client, the response to the first request including state information specific to the first request and to the memory of the server, the state information including data determined in the processing of the first request from the client;
clear the memory of the state information specific to the first request;
receive a second request for service from the client during the communication session, the second request including the state information specific to the first request and the data determined in the processing of the first request from the client that was previously stored in the memory of the server; and
restore a state of the memory of the server based on the state information specific to the first request received in the second request.

10. The system of claim 9, wherein the communication session is interrupted for at least one period of time between the first request and the second request.

11. The system of claim 10, wherein the communication session is resumed prior to the receiving of the second request.

12. The system of claim 9, wherein the processor further associates a digital signature with the state information specific to the first request, wherein the response to the first request provided to the client includes the signature associated with the state information specific to the first request.

13. The system of claim 12, further comprising the processor to verify the signature associated with the state information specific to the first request, wherein the second request received from the client includes the signature associated with the state information specific to the first request.

14. The system of claim 13, wherein the verifying comprises determining whether the signature associated with the state information specific to the first request and received with the second request has been changed, and restoring the state of the server memory based on the state information specific to the first request only in an instance the signature has not been changed.

15. The system of claim 9, further comprising the processor to:

encrypt the state information specific to the first request included with the response to the first request provided to the client; and
decrypt the state information specific to the first request included with the second request received from the client.

16. The system of claim 9, further comprising the processor to process the second request using the restored state of the memory.

17. A computer-implemented method, the method comprising:
implementing, by the computer, operations of the method in the following order:
receiving, by a server, a first request for service from a client during a communication session;
processing, by the server, the first request from the client;
storing state information specific to the first request in a memory of the server, the state information specific to the first request comprising one of: a data structure including application data and at least some program code for executing the application data and a data structure including application data;
providing, from the server, a response to the first request to the client, the response to the first request including a first portion of state information specific to the first request and to the memory of the server, the state information including data determined in the processing of the first request from the client;
clearing the server memory of the first portion of the state information specific to the first request;
receiving, by the server, a second request for service from the client during the communication session, the second request including the first portion of the state information specific to the first request and the data determined in the processing of the first request from the client that was previously stored in the memory of the server; and
restoring a state of the server memory based on the first portion of the state information specific to the first request received in the second request.

18. The method of claim 17, further comprising:
associating, by the server, a digital signature with the first portion of the state information specific to the first request, wherein the response to the first request provided to the client includes the signature associated with the first portion of the state information specific to the first request.

19. The method of claim 18, further comprising:
verifying, by the server, the signature associated with the first portion of the state information specific to the first request, wherein the second request received by the server from the client includes the signature associated with the first portion of the state information specific to the first request.

20. The method of claim 19, wherein the verifying comprises determining whether the signature associated with the first portion of the state information specific to the first request received by the server with the second request has been changed, and restoring the state of the server memory based on the first portion of the state information specific to the first request only in an instance the signature has not been changed.

* * * * *